United States Patent [19]

Ippolito et al.

[11] Patent Number: 5,024,566
[45] Date of Patent: Jun. 18, 1991

[54] ALL IN ONE DRILL BIT

[76] Inventors: Guy F. Ippolito, 7322 Bent Oak Dr., Port Richey, Fla. 34668; George Spector, 233 Broadway RM 3815, New York, N.Y. 10007

[21] Appl. No.: 311,971

[22] Filed: Feb. 17, 1989

[51] Int. Cl.⁵ .............................. B23B 51/12
[52] U.S. Cl. ............................. 408/197; 408/186; 408/240; 408/226; 279/46 R; 81/439; 81/437
[58] Field of Search ........ 408/186, 197, 198, 238-240, 408/231-233, 20, 21, 226; 279/46 R, 47, 48, 41 R, 42, 93, 94, 117, 89, 1 TS, 99; 81/439, 437, 460, 461

[56] References Cited

U.S. PATENT DOCUMENTS

| 453,622 | 6/1891 | Cheney | 279/42 |
|---|---|---|---|
| 2,303,565 | 12/1942 | Luna | 408/117 X |
| 2,346,364 | 4/1944 | Dowe | 279/93 |
| 2,679,770 | 6/1954 | Carter et al. | 144/104 |
| 2,851,915 | 9/1958 | Martinez | 279/93 |
| 3,194,286 | 7/1965 | Wagner | 81/439 |
| 3,750,729 | 8/1973 | Lemieux | 81/439 |
| 3,753,455 | 8/1973 | Butler | 81/439 |
| 4,572,038 | 2/1986 | Graham | 81/439 |
| 4,604,005 | 8/1986 | Russ | 408/117 X |
| 4,762,036 | 8/1988 | Orlitzky et al. | 81/437 |

FOREIGN PATENT DOCUMENTS 14425  5/1956  Fed. Rep. of Germany ........ 81/439

*Primary Examiner*—Gary F. Paumen
*Assistant Examiner*—Robert Schultz

[57] ABSTRACT

A selective drill bit attachment for a standard portable electric drill is provided and includes a housing for carrying a plurality of different sized drill bits in which one of the drill bits can be selected and manually extended into an operable position so as to be used by a standard portable electric drill. In a modification a locking mechanism is utilized to hold the selective drill bit stationary to the housing.

5 Claims, 1 Drawing Sheet

U.S. Patent | June 18, 1991 | 5,024,566
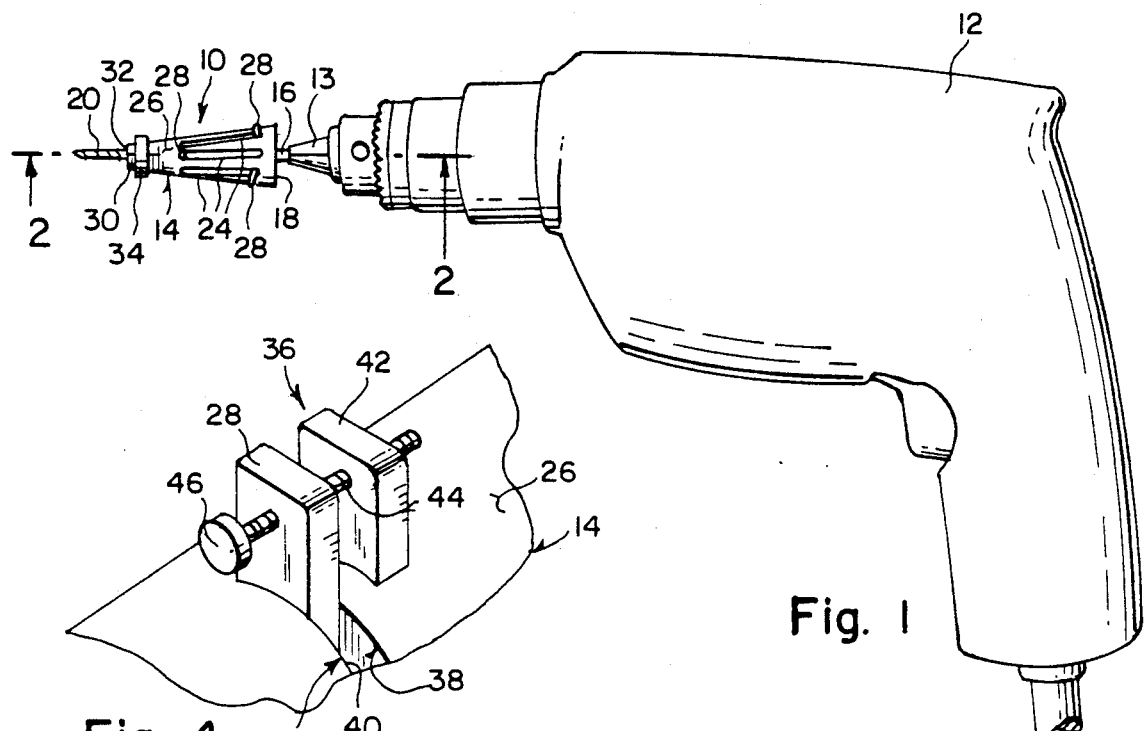
Fig. 1
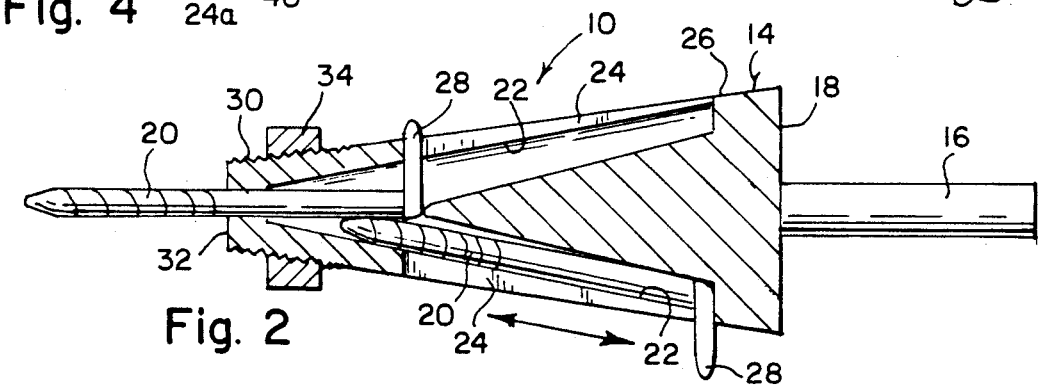
Fig. 4
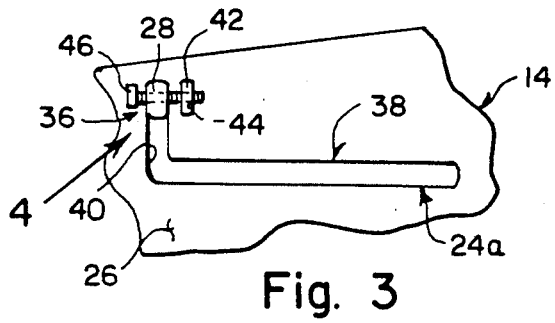
Fig. 2
Fig. 3

ALL IN ONE DRILL BIT

BACKGROUND OF THE INVENTION

The instant invention relates generally to portable electric drills and more specifically it relates to a selective drill bit attachment.

Numerous portable electric drills have been provided in prior art that are adapted to select a desired self contained drill bit or the like and advancing that particular drill bit or the like into position for use. For example, U.S. Pat. Nos. 2,303,565: 2,679,770 and 4,604,005 all are illustrative of such prior art. While these units may be suitable for the particular purpose to which they address, they would not be as suitable for the purposes of the present invention as heretofore described.

SUMMARY OF THE INVENTION

A primary object of the present invention is to provide a selective drill bit attachment that will overcome the shortcomings of the prior art devices.

Another object is to provide a selective drill bit attachment that includes a housing for carrying a plurality of different sized drill bits in which one of the drill bits can be selected and manually extended into an operable position so as to be used by a standard portable electric drill.

An additional object is to provide a selective drill bit attachment that includes a locking mechanism to hold the selected drill bit stationary to the housing.

A further object is to provide a selective drill bit attachment that is simple and easy to use.

A still further object is to provide a selective drill bit attachment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of a portable electric drill with invention installed thereon.

FIG. 2 is an enlarged cross sectional view taken along line 2—2 in FIG. 1 showing the internal structure of the electric drill bit attachment housing.

FIG. 3 is a top view of a modification with parts broken away showing an L-shaped slot and mechanism for locking the drill bit arm stationary to the housing.

FIG. 4 is a perspective view taken in direction of arrow 4 in FIG. 3 showing the drill bit arm, screw and raised projection member in greater detail.

DETAILED DESCRIPTION OF THE PREFERRED EMBODIMENTS

Turning now descriptively to the drawings, in which similar reference characters denote similar elements throughout the several views, FIGS. 1 and 2 illustrate a selective drill bit attachment 10 for a standard portable electric drill 12 having a chuck head 13 consisting of a frustrum cone shaped housing 14 having a shank 16 extending from wide end 18 thereof for removably connecting the housing 14 to the chuck head 13 of the standard portable electric drill 12. A plurality of different sized drill bits 20 are carried within the housing 14.

The housing 14 has a plurality of radially tapered apertures 22 therein. Each of the apertures 22 have an elongated slot 24 extending to outer surface 26 of the housing 14. Each of the drill bits 20 has a rear transverse arm 28 so that each of the drill bits 20 can be slidably disposed within each of the apertures 22 in the housing 14 with each of the arms 28 extending through each of the slots 24. This allows for selecting and manually extending one of the drill bits 20 into an operable position.

The housing 14 has a externally threaded jaw 30 formed on narrow end 32 thereof. An internally threaded collar 34 is engagable with the jaw 30 for clamping the selected drill bit 20 in the operable position so as to be used by the standard portable electric drill 12.

As shown in FIGS. 3 and 4 a structure 36 is provided for locking one of the drill bit arms 28 stationary to the housing 14. The slot 24a in the housing 14 is in an L-shaped configuration 38 with shorter leg 40 being disposed towards narrow end 32 of the housing 14. A raised projection member 42 that has a threaded hole 44 is disposed near free end of the shorter leg 40 of the slot 24a. A set screw 46 is threaded through free end of the arm 28 so that when the selected drill bit 20 is placed into the operable position the arm 28 can be disposed into the shorter leg 40 of the slot 24a and the set screw 46 can be threaded into the threaded hole 44 of the respective raised projection member 42.

While certain novel features of this invention have been shown and described and are pointed out in the annexed claims, it will be understood that various omissions, substitutions and changes in the forms and details of the device illustrated and its operation can be made by those skilled in the art without departing from the spirit of the invention.

What is claimed is:

1. A selective drill bit attachment for a standard portable electric drill having a chuck head, said attachment comprising:

a) a frustum cone shaped housing with a wide end and a jaw with a narrow end having a shank extending rearwardly from said wide end thereof for removably connecting said housing to the chuck head of the standard portable electric drill;

b) a plurality of different sized drill bits carried within said housing; each one of said bits selectively movable to an operable position in which a cutting end of the selected on bit protrudes from the narrow end of said housing;

c) means within said housing for selecting and manually extending each of said drill bits into said operable position and d) means on said narrow end of said housing for clamping said jaw on said selected drill bit in said operable position so as to be used by the standard portable electric drill.

2. A selective drill bit attachment as recited in claim 1 wherein said selecting and manually extending means includes:

a) said housing having a plurality of radially tapered apertures therein, each of said apertures having an elongated slot extending to outer surface of said housing; and b) each of said drill bits having a rear transverse arm so that each of said drill bits can be slidably disposed within each of said apertures in said housing with each of said arms extending through each of said slots.

3. A selective drill bit attachment as recited in claim 2 wherein said clamping means includes:
   a) said housing having said externally threaded jaw formed on narrow end thereof; and
   b) an internally threaded collar engagable with said jaw.

4. A selective drill bit attachment as recited in claim 3 further comprising means for locking each of said drill bit arms stationary to said housing.

5. A selective drill bit attachment as recited in claim 4 wherein said locking means includes:

a) each of said slots being in L-shaped configuration having a transverse shorter leg disposed towards said narrow end of said housing;
b) a plurality of raised projection members, each having a threaded hole disposed adjacent to each of said shorter legs of each of said slots, wherein each said arm has a hole alignable with said threaded hole; and
c) a plurality of set screws, each threadedly mounted in said members adapted to extend through said holes in said arms, so that when said selected drill bit is placed into an operable position said arm can be disposed into said shorter leg of said slot and said set screw can extend through said arms and be threaded into said threaded hole of said members to lock the arms into an operable position.

* * * * *